United States Patent [19]

Hay

[11] 3,826,546

[45] July 30, 1974

[54] SELF-ADJUSTING THRUST BEARING ASSEMBLY

[75] Inventor: Charles N. Hay, Sandusky, Ohio

[73] Assignee: General Motors Corporation, Detroit, Mich.

[22] Filed: May 21, 1973

[21] Appl. No.: 362,481

[52] U.S. Cl. ............................................. 308/234
[51] Int. Cl. ......................................... F16c 19/10
[58] Field of Search........................... 308/234, 165

[56] References Cited
UNITED STATES PATENTS
1,832,649   11/1931   Orelind............................. 308/234

Primary Examiner—Charles J. Myhre
Assistant Examiner—Frank Susko
Attorney, Agent, or Firm—Arthur N. Krein

[57] ABSTRACT

A thrust bearing assembly as for the shaft of the power steering gear of a vehicle, the assembly including a thrust plate engaging the screw end of the steering shaft journalled in the steering gear housing, a needle bearing assembly being positioned between the thrust plate and a pair of cup-shaped cam elements, one of which is centered and held axially within the steering gear housing by an end cap of the housing, a torsion spring being connected at opposite ends to the cam elements to cause them to rotate relative to each other to effect axial spreading of the cam elements for taking up end play of the steering shaft.

5 Claims, 2 Drawing Figures

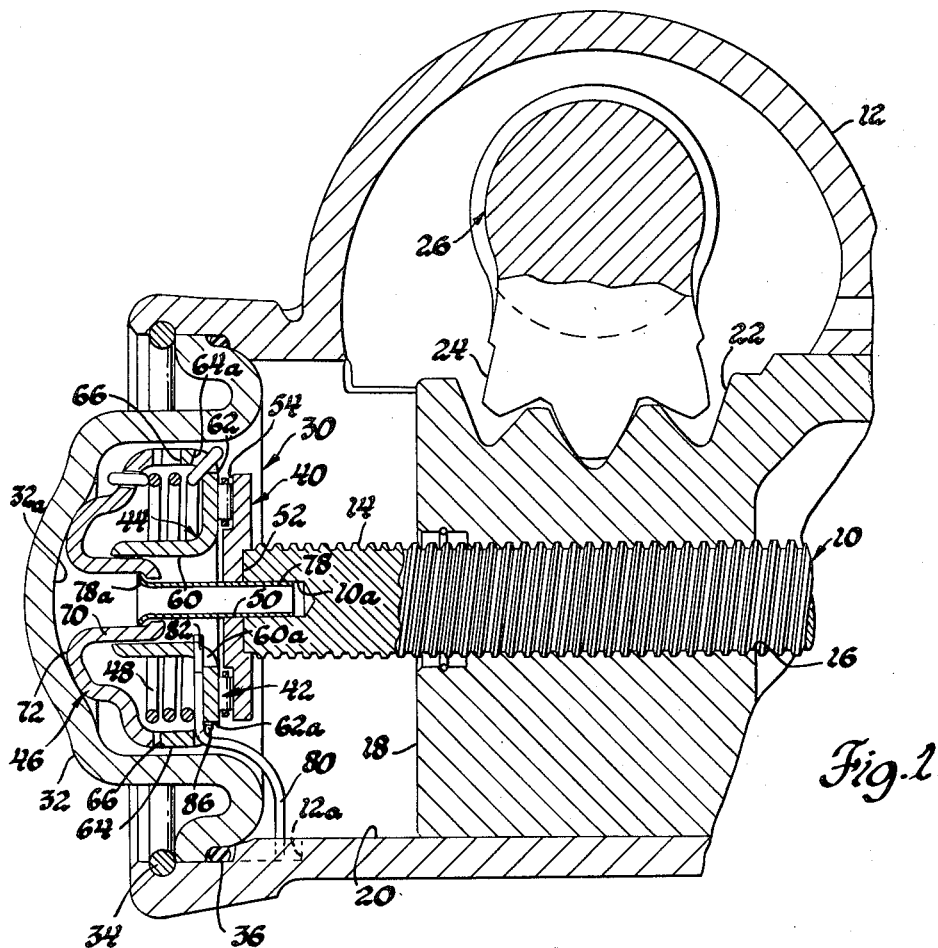
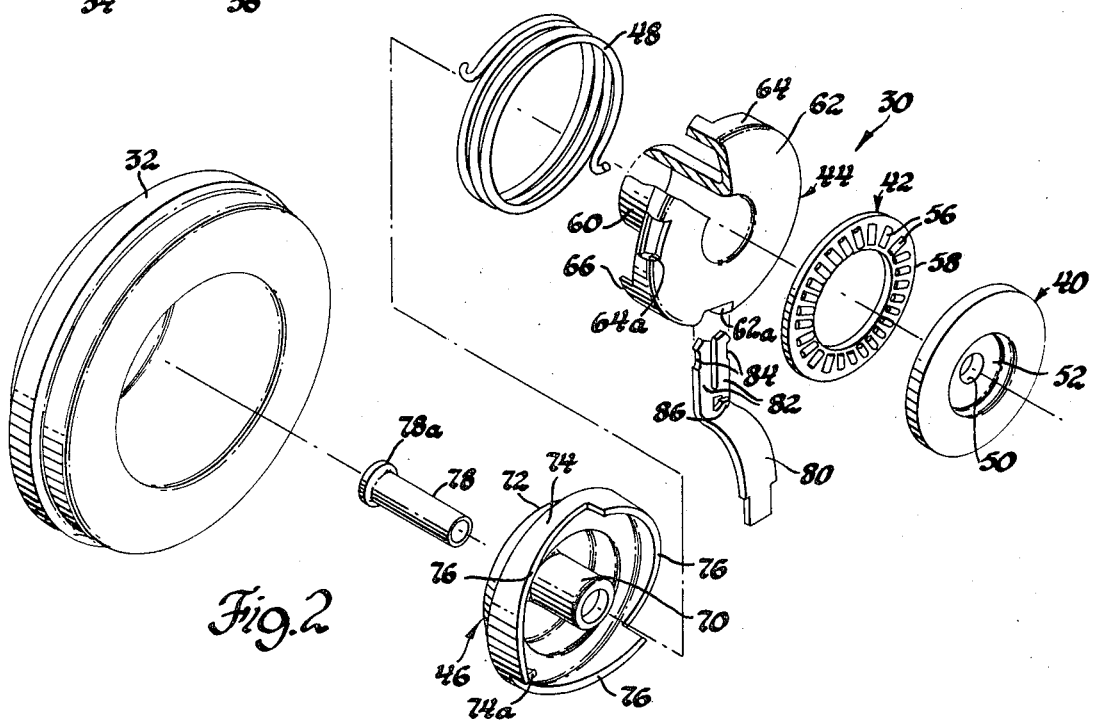

SELF-ADJUSTING THRUST BEARING ASSEMBLY

This invention relates to a self-adjusting thrust bearing assembly and, specifically, to a self-adjusting thrust bearing assembly cooperating with a shaft journalled in a housing.

In various rotating mechanisms, a machine element such as a shaft is rotatably journalled within a housing to cooperate with another machine element in such a manner that the shaft must be supported to take up any end thrust of the shaft.

Thus, for example, the worm gear in one form of a power steering gear assembly for a vehicle is rotatably supported by suitable bearings in the housing of the steering gear unit, the shaft at one end thereof having suitable threads thereon to mate with corresponding internal threads in a piston also positioned within the housing. In this type power steering gear assembly, the free threaded end of the shaft extends through the piston and is usually provided with some form of thrust bearing arrangement in engagement with the shaft. However, such prior art arrangements require adjustment at intervals.

It is therefore the principal object of this invention to improve a thrust bearing assembly whereby the thrust bearing assembly is self-adjustable and self-aligning with respect to the ends of a rotatable shaft.

Another object of this invention is to provide a self-adjusting thrust bearing assembly for a power steering gear assembly to provide constant self-adjustment of the thrust bearing preload against a rotatable shaft of the steering gear assembly.

A further object of this invention is to provide a unitized self-adjusting thrust bearing assembly for use in a power steering gear assembly or similar device which is adapted to be installed between the free end of a shaft and an end cap of the housing in which the shaft is journalled.

These and other objects of the invention are attained by means of a self-adjusting thrust bearing assembly including a thrust plate adapted to engage an end of a shaft, a needle thrust bearing positioned between the thrust plate and a pair of cup-shaped cam elements, one of which engages the needle thrust bearing and the other of which has a self-aligning semi-spherical end face, a torsion spring being interconnected between the two cup-shaped cam elements to effect rotation of the cam elements with respect to each other and, an assembly tube extending through the cup-shaped cam elements needle thrust bearing through the thrust plate for insertion into the shaft on which this assembly is to be used for retaining this assembly on the end of the shaft.

For a better understanding of the invention, as well as other objects and further features thereof, reference is had to the following detailed description of the invention to be read in connection with the accompanying drawings, wherein:

FIG. 1 is a sectional view of a portion of a power steering gear assembly for an automotive vehicle having a self-adjusting thrust bearing assembly in accordance with the invention; and, FIG. 2 is an exploded axonometric view of the self-adjusting thrust bearing assembly of FIG. 1.

Although the self-adjusting thrust bearing assembly of the invention could be used with other forms of structures, it is shown in FIG. 1 as used in a power steering gear assembly for an automotive vehicle. In the power steering gear assembly shown, a steering shaft 10 is suitably journalled for rotation by bearings, not shown, in a portion of the steering gear housing 12. The free end of this shaft 10, the lower end of this shaft as it would be positioned in a vehicle, is externally threaded at 14 to mate in an internally threaded opening 16 extending through a piston 18 slidably mounted in the cylinder portion 20 of the steering gear housing 12. Rack teeth 22 on the outer periphery of piston 18 engage teeth 24 on a pitman shaft sector 26, also suitably journalled in a portion of the housing 12 whereby the pitman shaft can effect steering through a conventional vehicle steering mechanism, also not shown, since these last described elements form no part of the subject invention.

The lower end, the left-hand end as seen in FIG. 1, of the shaft 10 is provided with a self-adjusting thrust bearing assembly, generally designated 30, of the subject invention which is positioned between this end of the shaft and a closure cap 32 closing the open end of the cylinder portion 20 of housing 12, the cap 32 being retained in the housing by means of a split or snap ring retainer 34 mounted in a suitable annular groove provided for this purpose in the end of the housing, an annular ring seal 36 being sandwiched on the inboard side of the cap 32 between the outer periphery of the cap and an inner peripheral surface of the housing 12.

The self-adjusting thrust bearing assembly 30 includes as major components thereof a thrust plate 40 adapted to abut against the lower end of the shaft 10, a needle thrust bearing 42, a pair of cup-shaped cam members 44 and 46 and a torsional spring 48.

The thrust plate 40 of annular configuration with an aperture 50 through the center thereof is preferably provided on one side thereof with an annular recessed surface 52 of a diameter to receive and abut against the free end or left-hand end of the shaft 10, the other side of the thrust plate being provided with a shouldered annular radial extending portion 54 to serve as a race for the needle thrust bearing 42, which as seen in FIG. 2, includes a plurality of roller elements 56 in the form of needle rollers rotatably journalled and retained by an annular needle bearing ring cage 58. The other race for the needle thrust bearing 42 is provided by the radially extending flange of the cup-shaped cam member 44, which is hereinafter referred to as the bearing cam. Bearing cam 44 is formed with a tubular straight guide portion 60, a radially outward extending flange portion 62, the outer surface of which forms the other race for the thrust needle bearing 42, and a return bent portion or collar 64 extending back over the tubular guide portion 60 and parallel to the axis of this latter portion. The free end or left-hand end face of the collar 64 is provided, in the embodiment shown, with three equally spaced camming ramps or cam surfaces 66 for a purpose to be described.

Cam element 46, which is also cup-shaped and referred to hereinafter as the aligning cam, has a tubular guide portion 70 of an outer diameter to be slidably received in the tubular guide portion 60 of bearing cam 44, a radially extending flange portion 72 which is curved so that the outer convex surface of this flange portion of the cam is semi-spherical in configuration, as seen in FIG. 1, for a purpose to be described, the radial extending flange 72 terminating in a return bent collar 74, the free end surface of which is also provided with these camming ramps or cam surfaces 76 for cooperation with the camming ramps or cam surfaces 66 on cam element 44 to effect and maintain axial displacement of the needle thrust bearing 42 and thrust plate 40 relative to the end of the shaft 10 in a manner to be described.

The coiled torsion spring 48 is used to normally rotatively bias the aligning cam 46 in a direction relative to the bearing cam 44 to cause rotational motion of the aligning cam with respect to the bearing cam 44 in an up-ramp direction with respect to the cam surfaces on these elements to cause maximum axial extension of the bearing cam relative to the aligning cam to preload the needle thrust bearing 42 and the thrust plate 40 against the end of the shaft 10, as desired, by affecting movement of this shaft to the right, as seen in FIG. 1, the aligning cam 46 being held against axial movement in one direction by its engagement with the closure cap 32 of the steering gear housing 12.

The torsion spring 48, which is placed in tension during assembly of the bearing assembly 30, is mounted to encircle the straight guide portion of the bearing cam 44 and is of a diameter so as to be encircled by the collars 64 and 74 of the bearing cam and aligning cam, respectively, with one end of the spring hooked to the bearing cam through a suitable slot 64a therein, this slot being shown 90° out of position in FIG. 1, and the opposite end of the spring being hooked over a portion of the aligning cam as it extends through a suitable slot 74a formed therein whereby these cam elements are normally rotatively biased with respect to each other in a cam up-ramp direction, that is, the aligning cam 46 will rotate in a clockwise direction, as seen in FIG. 2.

It can be seen from the foregoing that relative rotation of the aligning cam 46 with respect to the bearing cam 44 in the opposite direction will result in a down-ramp movement, thus shortening the axial extension of these elements. In addition, the angle of the camming ramps or cam surfaces 66 and 76 of these elements are so selected that these cam elements will frictionally lock against any axial force applied against these elements in a direction which would otherwise shorten their axial extension relative to each other.

To permit unit assembly and retention of these elements to the end of the shaft 10, an assembly pin, in the form of a tube 78 is provided which extends through the tubular guide 70 of the cam element 46 and through the aperture 50 in the thrust plate for engagement in a suitably bored aperture 10a provided for this purpose at the free end of the shaft 10, the outboard end of this tube, the left-hand end as seen in FIG. 1, is suitably flared or otherwise enlarged to provide a radially extended portion or flange 78a of a diameter to prevent passage of this end of the tube through the aligning cam 46. As seen in FIG. 1, the assembly tube 78 when assembled to the shaft 10 is of such a length to prevent full rise or up-camming of the camming surfaces on the cam elements 44 and 46 with respect to each other to prevent unwinding of the previously pretensioned coiled spring 48.

As shown in FIG. 1, the bearing cam 44 is positioned within the steering gear housing 12 to permit axial movement thereof but it is restrained against rotative movement relative to the housing by means of an arm 80, which may be formed integral with the bearing cam 44 or, as shown, as a separate arm element suitably secured thereto, the arm extending radially from the bearing cam 44 into sliding engagement in an axial slot 12a provided for this purpose within the steering gear housing 12.

Although any suitable means can be used to secure the arm 80 to the bearing cam 44, in the embodiment disclosed, the arm 80, as best seen in FIG. 2, is bifurcated at one end to provide two spring legs 82 having notches 84 on the outer edges thereof for snap engagement through the aperture 60a at the junction of the straight guide portion 60 and radial flange 62 of bearing cam 44, the arm being provided intermediate the ends thereof with a tab 86, formed by piercing the arm, engaging a surface of the radial flange 62 adjacent an aperture 62a through this portion of the cam element 44.

As previously described, the outer radially extending flange 72 of the cam element or aligning cam 46 is semi-spherical and, as seen in FIG. 1, a portion of the inner concave surface of the closure cap 32 is also of semi-spherical configuration formed complementary to the configuration of the outer surface of the aligning cam 46 whereby during assembly of these components and in operation, the aligning cam 46 is self-centering within the cap 32.

In assembly of the elements shown, the self-adjusting thrust bearing assembly 30 is first assembled to the shaft 10 using the assembly tube 78 to center this assembly onto the end of the shaft and to retain it in position thereon, the spring 48 having previously been wound as desired. The closure cap 32 is then applied with some force against the end of the cam element or aligning cam 46 to take up any stack-up tolerances of the steering shaft 10 and then the closure cap 32 is rotated to rotate the aligning cam 46 in a down-ramp direction with respect to the bearing cam causing axial collapse of the cams until these cams seat and then the closure cap 32 is locked in place by the snap ring retainer 34. That is, the ramp surfaces 66 and 76 slip with respect to each other, thus allowing aligning cam 46 to rotate relative to the bearing cam 44 in the down-ramp direction thus decreasing the axial dimension across these elements.

What is claimed is:

1. In a machine assembly including a housing having an opening at one end thereof closable by a cap, said cap having an inner concave surface thereof of semi-spherical configuration, a shaft extending longitudinally in said housing concentric with said opening and rotatably journalled about an axis in said housing with a free end of the shaft in spaced relation to said cap, and a self-adjusting thrust bearing assembly positioned within said housing in abutment at one end against said free end of said shaft and at its other end against said inner surface of said cap, said self-adjusting thrust bearing assembly including an annular thrust plate having one side thereof in abutment against said free end of said shaft and provided on its other side with a bearing race surface, a needle thrust bearing positioned for rolling engagement with said bearing race surface on said thrust bearing, a bearing cam positioned to engage said needle thrust bearing, said bearing cam having a tubular guide portion, a radially extending flange portion, the outer surface of which forms a race path for said needle thrust bearing and a return bent portion forming a cam faced collar extending back over said tubular guide portion, said bearing cam being positioned within said housing for axial movement relative thereto and mounted against rotation relative to said housing, an aligning cam slidably received in said tubular guide portion of said bearing cam, said aligning cam having an axial extending tubular guide portion slidably telescoped within said tubular guide portion of said bearing cam, a radially extending flange portion having an outer convex semi-spherical surface complementary to said semi-spherical surface of said cap and a return bent portion forming a cam faced collar extending back over said tubular guide portion and adapted to cooperate with said cam face collar of said bearing cam to vary the axial dimension across said bearing cam and said aligning cam, and torsion spring means encircling said guide portion of said bearing cam with one end of said spring engaging said bearing cam and the opposite end of said spring engaging said aligning cam to normally rotatively bias said aligning cam relative to said bearing cam in an up-cam direction.

2. In a machine assembly according to claim 1 wherein said free end of said shaft is provided with an axially extending bored hole therein, said thrust plate is provided with a central aperture therethrough and wherein said assembly further includes an assembly tube having one end thereof flared, the opposite end of said tube extending through said tubular guide portions of said aligning cam, said tubular portion of said bearing cam, said aperture through said thrust plate and is engaged in said axial bore hole in said shaft.

3. In a machine assembly including a housing having a closable opening at one end thereof, a cap secured to said housing closing said opening, said cap having a concave inner surface portion of semi-spherical configuration, a shaft rotatively journalled about an axis in and extending longitudinally within said housing in alignment with said opening, said shaft having a free end adjacent to and spaced from said cap, a self-adjusting thrust bearing assembly positioned within said housing with one end of said assembly abutting against said cap and the other end of said assembly in abutment against the free end of said shaft, said self-adjusting thrust bearing assembly including a first cam means and a second cam means mounted in opposed relation to each other in said housing with said first cam means having a convex outer surface of semi-spherical configuration in abutment against said concave inner surface of said cap, an annular needle thrust bearing and an annular thrust plate interposed between said second cam means and said free end of said shaft with said thrust plate engaging said free end of said shaft concentric therewith, said second cam means being positioned for axial movement relative to said shaft and fixed relative to said housing to prevent rotational movement of said second cam means relative to said housing and, coiled spring means connected at one end to said first cam means and connected at its opposite end to said second cam means to normally rotatively bias said first cam means relative to said second cam means in an up-cam direction.

4. In a machine assembly according to claim 3 wherein said second cam means is a cup-shaped bearing cam, said bearing cam having a tubular guide portion, a radially extending flange portion, the outer surface of which engages said annular needle thrust bearing and a return bent portion forming a cam faced collar extending back over said tubular guide portion, and wherein said first cam means is a cup-shaped aligning cam, said aligning cam having an axial extending tubular guide portion slidably telescoped within said tubular guide portion of said bearing cam, a radially extending flange portion having an outer convex semi-spherical surface engageable with said concave surface of said cap and a return bent portion forming a cam shaft collar extending back over said tubular guide portion for engagement with said cam faced collar of said bearing cam.

5. In a machine assembly according to claim 4 wherein said free end of said shaft is provided with a bored hole concentric with the rotational axis thereof, said thrust plate being provided with a central aperture therethrough and wherein said assembly further includes an assembly tube having a radially extending flange portion at one end thereof, the opposite end of said tube extending through said tubular guide portions of said aligning cam and said bearing cam, said needle thrust bearing and said aperture in said thrust plate for engagement within said bored hole in said shaft, said assembly tube being of a length to prevent full up-camming of said aligning cam relative to said bearing cam.

* * * * *